United States Patent
Luo et al.

(10) Patent No.: US 8,848,603 B2
(45) Date of Patent: Sep. 30, 2014

(54) PRECODING CONTROL CHANNELS IN WIRELESS NETWORKS

(75) Inventors: Tao Luo, San Diego, CA (US); Dung Ngoc Doan, San Diego, CA (US); Taesang Yoo, San Diego, CA (US); Xiaoxia Zhang, San Diego, CA (US); Kibeom Seong, West New York, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 319 days.

(21) Appl. No.: 12/816,708

(22) Filed: Jun. 16, 2010

(65) Prior Publication Data

US 2011/0141927 A1    Jun. 16, 2011

Related U.S. Application Data

(60) Provisional application No. 61/219,308, filed on Jun. 22, 2009.

(51) Int. Cl.
  *H04J 1/16*    (2006.01)
  *H04L 25/03*   (2006.01)
  *H04L 5/00*    (2006.01)

(52) U.S. Cl.
  CPC . *H04L 25/03343* (2013.01); *H04L 2025/03426* (2013.01); *H04L 5/0048* (2013.01); *H04L 2025/03414* (2013.01)
  USPC .......................................... 370/328; 375/295

(58) Field of Classification Search
  CPC ..... H04W 28/04; H04W 72/00; H04W 74/04; H04W 72/12; H04W 72/0406; H04W 72/0413; H04W 72/042; H04W 72/1205; H04W 72/1231
  USPC ........ 370/203, 252, 328, 338, 295, 342, 474; 375/141, 219, 267, 285, 295, 296, 299, 375/346
  See application file for complete search history.

(56) References Cited

U.S. PATENT DOCUMENTS

| 2007/0217540 A1* | 9/2007 | Onggosanusi et al. ....... 375/267 |
| 2008/0049709 A1* | 2/2008 | Pan et al. ...................... 370/344 |

(Continued)

FOREIGN PATENT DOCUMENTS

WO    WO2008115588    9/2008

OTHER PUBLICATIONS

International Search Report and Written Opinion—PCT/US2010/039522, International Search Authority—European Patent Office—Feb. 22, 2011.

(Continued)

*Primary Examiner* — Habte Mered
*Assistant Examiner* — Prince A Mensah
(74) *Attorney, Agent, or Firm* — Dalei Dong

(57) ABSTRACT

Systems and methodologies are described that facilitate precoding signals transmitted over downlink control channels to provide transmit diversity. A dedicated reference signal (DRS) related to a wireless device can additionally be precoded such that the wireless device can determine a precoder or related parameters based at least in part on performing a channel estimate for the precoded DRS signal. The wireless device can utilize the determined precoder or related parameters to decode precoded signals received over downlink control channel resources. Additionally or alternatively, an access point can signal a sequence of precoders to the wireless device. The access point can cycle through the sequence of precoders to precode signals for transmission over downlink control channel resources, and the wireless device can decode the signals based at least in part on similarly cycling through the precoders for received signals.

47 Claims, 14 Drawing Sheets

(56) References Cited

U.S. PATENT DOCUMENTS

| | | | | |
|---|---|---|---|---|
| 2008/0225960 | A1* | 9/2008 | Kotecha et al. | 375/259 |
| 2008/0232494 | A1* | 9/2008 | Pan et al. | 375/260 |
| 2008/0260059 | A1 | 10/2008 | Pan | |
| 2008/0298482 | A1* | 12/2008 | Rensburg et al. | 375/260 |
| 2010/0091678 | A1* | 4/2010 | Chen et al. | 370/252 |
| 2010/0118989 | A1* | 5/2010 | Sayana et al. | 375/260 |
| 2010/0166094 | A1* | 7/2010 | Lee et al. | 375/267 |

OTHER PUBLICATIONS

Motorola, "Proposal for Dedicated Pilots in Downlink Precoding for EUTRA MIMO", [Online] vol. R1-070770, No. 48, Feb. 12, 2007, pp. 1-5, XP002494688, Retrieved from the Internet, URL,http,// www.3gpp.org/ftp/tsg ran/WGI RL 1/TSGR1_48/Docs/R1-O70770.zip>.

Nortel, "Rank-1 and Rank-2 Transmission for High Mobility UE", 3GPP Draft, R1-073977(Nortel-RANK1&2 Trans High Mobility UE), 3rd Generation Partnership Project (3GPP), Mobile Competence Centre, 650, Route Des Lucioles, F-06921 Sophia-Antipolis Cedex, France, vol. RAN WGI, no. Shanghai, China, Oct. 1, 2007, XP050107535,.

Panasonic, "Ack/Nack repetition and Implicit Resource Allocation for PUCCH", 3GPP Draft, R1-081796, 3rd Generation Partnership Project (3GPP), Mobile Competence Centre, 650, Route Des Lucioles, F-06921 Sophia-Antipolis.

Cedex, France, vol. RAN WGI, no. Kansas City, USA, May 14, 2008, XP050110175.

Taiwan Search Report—TW099120278—TIPO—Feb. 8, 2013.

* cited by examiner

PRECODING CONTROL CHANNELS IN WIRELESS NETWORKS

CROSS-REFERENCE

This application claims the benefit of U.S. Provisional Application Ser. No. 61/219,308, filed Jun. 22, 2009, and entitled "BEAMFORMING AND PRECODING ON PDCCH," the entirety of which is incorporated herein by reference.

BACKGROUND

I. Field

The present disclosure relates generally to wireless communications and more specifically to control data transmissions.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), etc.

Generally, wireless multiple-access communication systems may simultaneously support communication for multiple mobile devices. Each mobile device may communicate with one or more access points (e.g., base stations, femtocells, picocells, relay nodes, and/or the like) via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth. In addition, mobile devices can communicate with other mobile devices (and/or access points with other access points) in peer-to-peer wireless network configurations.

Logical channels can be defined over a set of transmission resources (e.g., portions of frequency over time), such as control channels, data channels, etc. Transmit and receive antennas can be used to communicate data over the resources defined by the channels. For example, in 3GPP LTE, a physical downlink control channel (PDCCH) is provided to allow access points to communicate control data to the mobile devices regarding communications received over one or more data channels. Control data can relate to, for example, quality of transmissions received over a related uplink data channel, automatic repeat/request (ARQ) or other retransmission indicators, etc. Diversity schemes can be implemented for the channels as well, for example, to minimize interference thereover. In one example, spatial-frequency block coding (SFBC) and/or frequency switched transmit diversity (FSTD) can be utilized to provide PDCCH diversity depending on a number of transmit antennas.

SUMMARY

The following presents a simplified summary of various aspects of the claimed subject matter in order to provide a basic understanding of such aspects. This summary is not an extensive overview of all contemplated aspects, and is intended to neither identify key or critical elements nor delineate the scope of such aspects. Its sole purpose is to present some concepts of the disclosed aspects in a simplified form as a prelude to the more detailed description that is presented later.

In accordance with one or more embodiments and corresponding disclosure thereof, various aspects are described in connection with facilitating precoding control data to mitigate interference among signals transmitted over control channel resources. In one example, an access point can select a precoder for precoding signals transmitted over control channel resources for a wireless device, and can precode a dedicated reference signal (DRS) for the wireless device based on the precoder. The wireless device can determine the precoder based at least in part on the DRS and subsequently utilize the precoder to decode signals received over control channel resources from the access point. In another example, the access point can cycle through a set of precoders to precode signals for transmission over control channel resources. In this example, the access point can communicate information regarding the set of precoders to the wireless device to facilitate decoding signals received over control channel resources at the wireless device.

According to an aspect, a method for wireless communication is provided that includes receiving one or more signals over resources allocated for a downlink control channel and determining a precoder utilized to precode the one or more signals. The method further includes decoding the one or more signals based at least in part on the precoder.

Another aspect relates to an apparatus for wireless communication. The apparatus can include at least one processor configured to receive one or more signals over resources related to a downlink control channel and determine a precoder utilized by to precode the one or more signals. The at least one processor is further configured to apply the precoder to the one or more signals to decode the one or more signals. The apparatus also comprises a memory coupled to the at least one processor.

Yet another aspect relates to an apparatus for wireless communication. The apparatus includes means for receiving one or more signals over resources allocated for a downlink control channel. The apparatus also includes means for determining a precoder utilized to precode the one or more signals and means for decoding the one or more signals based at least in part on the precoder.

Still another aspect relates to a computer program product, which can have a computer-readable medium including code for causing at least one computer to receive one or more signals over resources related to a downlink control channel and code for causing the at least one computer to determine a precoder utilized to precode the one or more signals. The computer-readable medium can also comprise code for causing the at least one computer to apply the precoder to the one or more signals to decode the one or more signals.

According to another aspect, a method for wireless communication is provided that includes selecting a precoder for precoding one or more signals for transmission over resources related to a downlink control channel and precoding the one or more signals using the precoder to generate one or more precoded signals. The method further includes transmitting the one or more precoded signals over the resources related to the downlink control channel.

Another aspect relates to an apparatus for wireless communication. The apparatus can include at least one processor configured to determine a precoder for precoding one or more signals for transmission over downlink control channel resources and generate one or more precoded signals based at least in part on applying the precoder to the one or more signals. The at least one processor is further configured to transmit the one or more precoded signals over the downlink control channel resources. The apparatus also comprises a memory coupled to the at least one processor.

Yet another aspect relates to an apparatus for wireless communication. The apparatus includes means for selecting a precoder for precoding one or more signals comprising control data for transmission over resources related to a downlink control channel. The apparatus also includes means for precoding the one or more signals using the precoder to produce one or more precoded signals and means for transmitting the one or more precoded signals over the resources related to the downlink control channel.

Still another aspect relates to a computer program product, which can have a computer-readable medium including code for causing at least one computer to determine a precoder for precoding one or more signals for transmission over downlink control channel resources. The computer-readable medium can also comprise code for causing the at least one computer to generate one or more precoded signals based at least in part on applying the precoder to the one or more signals and code for causing the at least one computer to transmit the one or more precoded signals to over the downlink control channel resources.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed, and the described embodiments are intended to include all such aspects and their equivalents.

DETAILED DESCRIPTION

Figure 1:
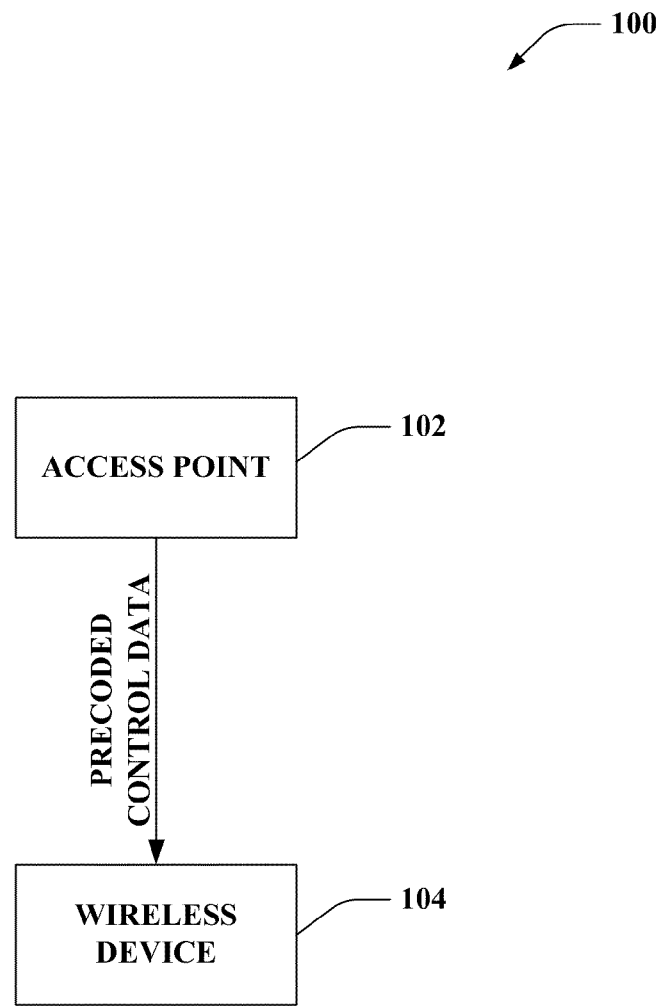
FIG. 1 is a block diagram of a system for precoding control data communications.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, mobile terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point or Evolved Node B (eNB) or other Node B) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Long Term Evolution (LTE) is a release that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Further, CDMA2000 and UMB are described in documents from an organization named "3rd Generation Partnership Project 2" (3GPP2).

Various aspects will be presented in terms of systems that can include a number of devices, components, modules, and the like. It is to be understood and appreciated that the various systems can include additional devices, components, modules, etc. and/or can not include all of the devices, components, modules etc. discussed in connection with the figures. A combination of these approaches can also be used.

Referring now to the drawings, FIG. 1 illustrates an example system 100 that facilitates precoding control data transmissions to provide transmit diversity in wireless networks. System 100 includes an access point 102 that provides a wireless device 104 with access to a core network (not shown). Access point 102 can be substantially any device that provides network access to one or more network components, such as a macrocell access point, femtocell or picocell access point, eNB, base station, relay node, and/or the like. Wireless device 104 can be substantially any device that receives access to a wireless network, such as a mobile device, UE, access terminal, subscriber unit, modem (or other tethered device), etc.

According to an example, wireless device 104 can receive resource allocations from access point 102 for communicating in a wireless network. For example, access point 102 can provide wireless device 104 with resources for receiving downlink communications from access point 102 and/or for providing uplink communications to access point 102. In one example, access point 102 can grant resources relating to a downlink control channel (such as a physical downlink control channel (PDCCH) in LTE) to wireless device 104 for receiving control data from access point 102, which can relate to other resources assigned to wireless device 104. For example, the downlink control channel can be utilized by access point 102 to communicate channel quality indicators (CQI), automatic repeat/request (ARQ) or hybrids ARQ (HARD) indicators, and/or the like, related to one or more uplink resource allocations over which wireless device 104 transmits data to access point 102.

In one example, access point 102 can precode control data or related signals transmitted over the downlink control channel to provide transmit diversity. Precoding can be similar to beamforming and can relate to weighing transmission of a signal from a plurality of transmit antennas to improve received signal power at the receiver. In this regard, a precoder can be utilized to apply a precoding to a signal. Thus, access point 102 can select a precoder for precoding one or more signals for transmission over control channel resources (e.g., the PDCCH) to wireless device 104, and wireless device 104 can decode the precoded signal based at least in part on determining the precoder utilized by access point 102.

Furthermore, access point 102 can transmit one or more reference signals (RS) to wireless device 104, and the one or more RSs can be common among a plurality of wireless devices (e.g., a common reference signal (CRS)), specific to wireless device 104 (e.g., a dedicated reference signal (DRS)), and/or the like. In one example, access point 102 can precode a DRS related to wireless device 104 using a selected precoder, and wireless device 104 can estimate the precoded channel from the precoded DRS signals to determine one or more parameters related to the precoder. Access point 102 can subsequently precode signals for transmission over control channel resources, as described, using the precoder used to precode the DRS, and wireless device 104 can decode the signals based on a precoder corresponding to the one or more determined parameters related to the precoder. In this example, access point 102 can determine a precoder to utilize based at least in part on control data received from wireless device 104 (e.g., channel quality indicator (CQI), precoding matrix indicator (PMI), and/or the like, related to one or more disparate communication channels between access point 102 and wireless device 104).

In another example, access point 102 can cycle through a sequence of precoders for each control data signal (e.g., which can be a subset of substantially all available precoders) and/or control channel elements (CCE) thereof. In this example, wireless device 104 can acquire information regarding the sequence of precoders (e.g., a set of precoders along with a cycling pattern). Thus, for example, access point 102 can signal the sequence of precoders (or related identifiers) to wireless device 104, which can store the sequence (or related identifiers) to determine a precoder utilized by access point 102 for a given signal and/or CCE. Moreover, in this example, access point 102 can signal to wireless device 104 to enable and/or disable precoding for signals received over downlink control channel resources (e.g., dynamically, semi-statically, and/or the like). In either case, precoding is provided for signals transmitted over downlink control channel resources to increase transmit diversity thereof, which can mitigate interference among downlink control transmissions of various access points.

Figure 2:
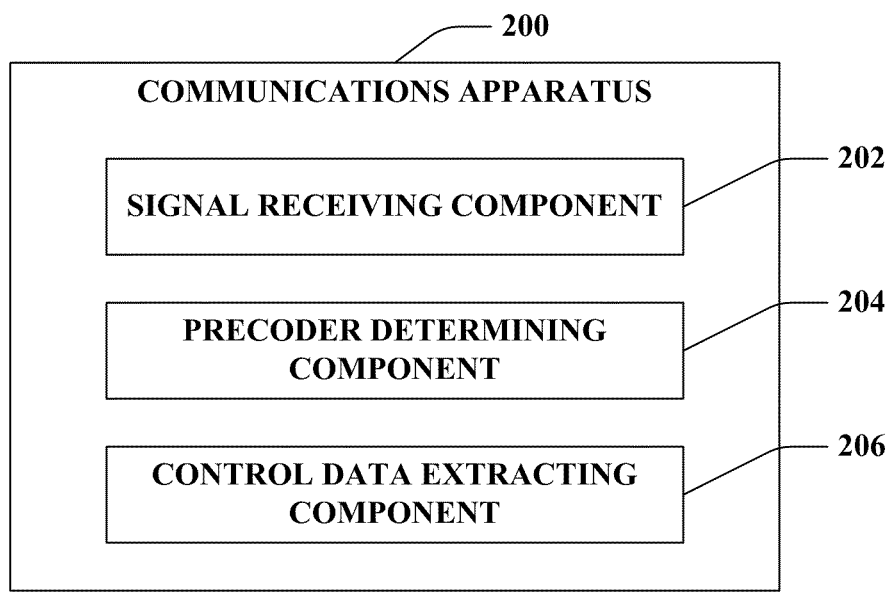
FIG. 2 is an illustration of an example communications apparatus for employment within a wireless communications environment.

Referring next to FIG. 2, a communications apparatus 200 that can participate in a wireless communications network is illustrated. The communications apparatus 200 can be a mobile device, access point, a portion thereof, or substantially any device that can transmit signals in a wireless network. The communications apparatus 200 can include a signal receiving component 202 that can obtain a precoded signal from a disparate communications apparatus over control channel resources, a precoder determining component 204 that discerns one or more parameters related to a precoder for decoding the precoded signal, and a control data extracting component 206 that receives control data from the precoded signal.

According to an example, signal receiving component 202 can obtain a precoded signal over resources related to a control channel allocated to communications apparatus 200. Precoder determining component 204 can discern one or more parameters related to a precoder utilized to precode the signal and/or determine the precoder related thereto. In one example, as described, precoder determining component 204 can determine the one or more parameters based at least in part on a received DRS related to communications apparatus 200. As described, for example, signal receiving component 202 can obtain a precoded DRS related to communications apparatus 200 previously or as part of the signal received over the control channel. Precoder determining component 204 can determine a channel estimate of the precoded DRS and can cancel out a precoder utilized to precode the DRS based on the channel estimate. In this case, precoder determining component 204 can provide the channel estimate of precoded DRS signals for decoding subsequent precoded communications.

In another example, signal receiving component 202 can have previously obtained a set of precoders (and/or indications thereof) from a disparate communications apparatus. In one example, the set of precoders can be a subset of precoders available for precoding communications at the disparate communications apparatus. In any case, precoder determining component 204 can store the set of precoders (and/or related indicators) for subsequently decoding signals received over the control resources. In this regard, precoder determining component 204 can cycle through the set to determine subsequent precoders for signals received over the control channel. Whether precoder determining component 204 discerns the precoder based on a precoded DRS or a received set of precoders, control data extracting component 206 can determine control data from the signals by applying decoding thereto according to the precoder (e.g., to undo precoding by the disparate communications apparatus).

Figure 3:
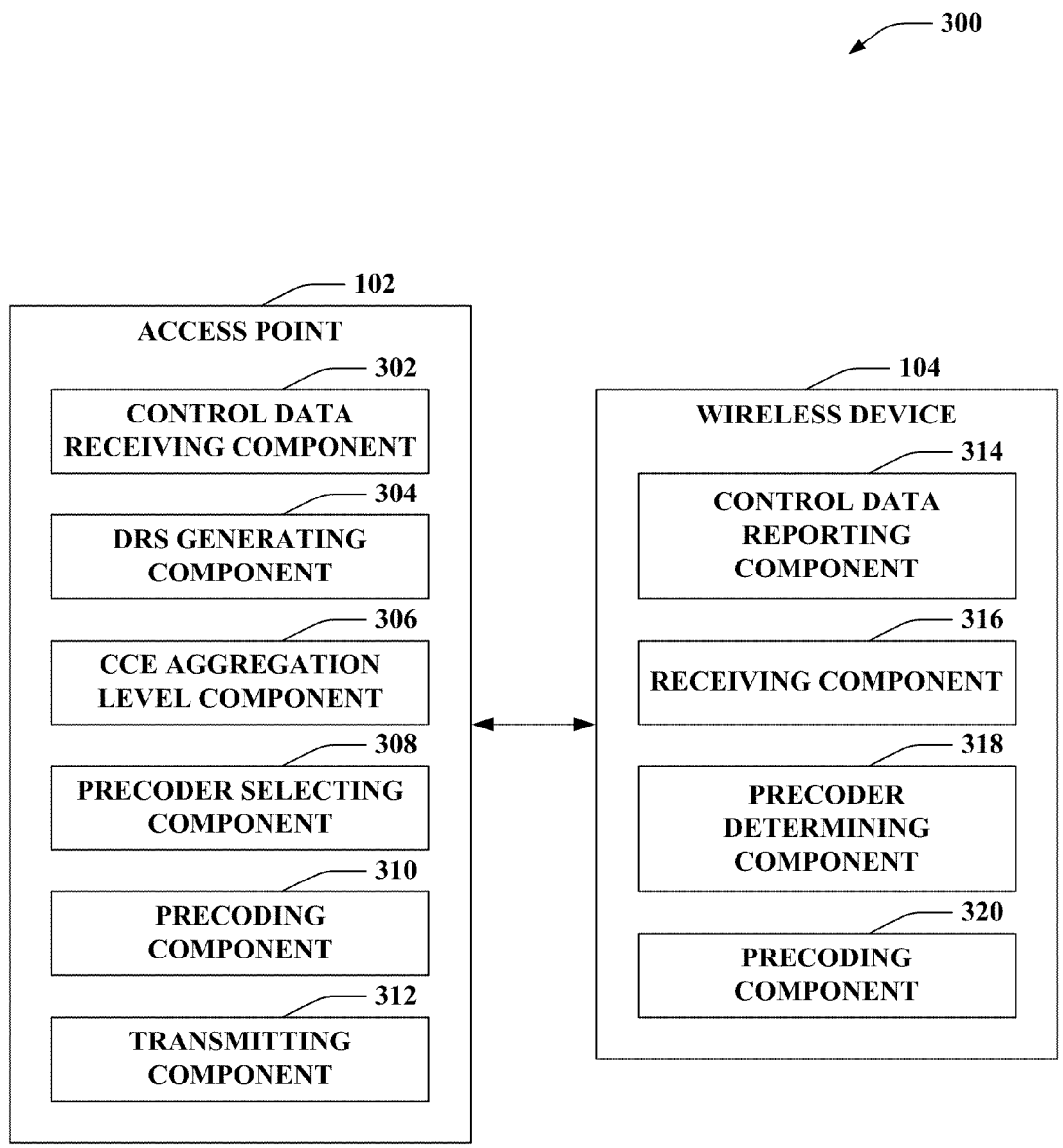
FIG. 3 illustrates an example wireless communication system for precoding signals transmitted over downlink control channel resources.

Now referring to FIG. 3, illustrated is a wireless communications system 300 that facilitates applying precoding to control channel transmissions. System 300 includes an access point 102 that communicates with one or more wireless devices, such as wireless device 104. Moreover, access point 102 can be a macrocell access point, femtocell access point, picocell access point, eNB, base station, and/or the like, and wireless device 104 can be a UE, mobile device, access terminal, subscriber unit, modem (or other tethered device), etc., as described. Furthermore, though the functionalities are shown and described in terms of downlink control channels, it is to be appreciated that access point 102 can comprise components of wireless device 104, and/or vice versa, to provide similar functionality for uplink control channels or other communication channels.

Access point 102 can comprise a control data receiving component 302 that obtains control data from one or more wireless devices, a DRS generating component 304 that generates a DRS specific to the one or more wireless devices, and a CCE aggregation level component 306 that can adjust a CCE aggregation level for transmitting control data based at least in part on the DRS. Access point 102 additionally includes a precoder selecting component 308 that determines a precoder for applying to one or more signals to be transmitted to a wireless device, a precoding component 310 that applies a precoding to one or more signals based on a determined precoder, and a transmitting component 312 that transmits the one or more precoded signals to a wireless device.

Wireless device 104 includes a control data reporting component 314 that provides control data related to one or more communications channels to an access point and a receiving component 316 that obtains one or more precoded signals from the access point. Wireless device 104 further comprises a precoder determining component 318 that discerns a precoder utilized to precode the one or more precoded signals and a precoding component 320 that utilizes the precoder to decode the one or more precoded signals.

According to an example, access point 102 can allocate resources for communicating with wireless device 104 over one or more communications channels, such as uplink/downlink data channels and/or control channels. In this regard, control data reporting component 314 can generate control data related to communications received from access point 102 over one or more channels, and can transmit the control data to access point 102 over uplink control channel resources. In one example, the control data can include CQI, PMI, and/or other feedback parameters. Moreover, for example, control data reporting component 314, for example, can report CQI, PMI, and/or similar metrics related to a CRS transmitted by access point 102. Control data receiving component 302 can obtain the control data, and precoder selecting component 308 can derive a precoder to utilize for precoding signals for transmission over downlink control channel resources to wireless device 104 based at least in part on the control data. For example, precoder selecting component 308 can utilize a precoder indicated by a received PMI, select a different precoder than previously used where CQI has degraded, and/or the like. Thus, in an example, precoder selecting component 308 can select a precoder that provides one or more communication metrics over a threshold level (e.g., SINR and/or the like) for the wireless device 104 based on the received CQI, PMI, etc.

Moreover, for example, DRS generating component 304 can create a DRS specific to wireless device 104. Precoding component 310 can precode a DRS related to wireless device 104 using the precoder, and transmitting component 312 can communicate the DRS in a wireless network. Receiving component 316 can obtain the DRS from access point 102, and precoder determining component 318 can discern one or more parameters related to a precoder utilized to precode the DRS. For example, as described, precoder determining component 318 can perform channel estimation on the DRS and can determine one or more parameters regarding a precoder utilized to precode the DRS at access point 102 based on the channel estimation. For example, precoder determining component 318 can utilize minimum mean squared error (MMSE) to estimate the channel and precoder. Thus, precoder determining component 318 can provide a precoded channel estimate based on detecting the DRS and cancelling out precoding from the DRS (e.g., based on a contents or other information expected in the DRS).

In addition, precoding component 310 can apply the same precoder (e.g., based at least in part on the precoded channel estimate) to signals transmitted over control channel resources allocated to wireless device 104. Transmitting component 312 can transmit the precoded signals, and receiving component 316 can obtain the signals over the control channel resources. Precoder determining component 318 can select the precoder discerned from the precoded DRS, and precoding component 320 can decode the signals transmitted over the control channel resources based at least in part on the determined precoder. Wireless device 104 can then process control data transmitted in the signals.

In one example, DRS generating component 304 can create the DRS within one or more CCEs over the control channel resources that carry downlink control data. CCEs can refer to portions of the control channel resources (e.g., fixed size blocks of frequency over time within the control channel resources). For example, the DRS generating component 304 can puncture the DRS in portions of the one or more CCEs, which can cause performance degradation in control data transmissions. In this regard, for example, CCE aggregation level component 306 can increase a number of CCEs utilized for transmitting downlink control data to improve signal quality thereof. For example, in LTE the first N OFDM symbols in a frame can be utilized for transmitting downlink control data, where N can range from zero to three. There can additionally be multiple CCEs within each of the N OFDM symbols. In this example, CCE aggregation level component 306 increases the number of CCEs utilized within each OFDM symbol and/or across OFDM symbols for transmitting downlink control data in light of precoding the DRS with the downlink control data.

In this example, precoding component 310 can precode CCEs in the control channel resources that can include both the DRS and downlink control data, and transmitting component 312 can communicate a resulting signal over a wireless network. Receiving component 316 can obtain the signals. Precoder determining component 318, for example, performs channel estimation, MMSE, etc., of the DRS within the CCEs and provides the precoded channel estimate, which can include or be determined based on one or more parameters regarding a precoder utilized to precode the communications, as described previously. Precoding component 320 can then decode a remainder of the CCEs using the determined precoder to retrieve downlink control data therefrom.

Figure 4:
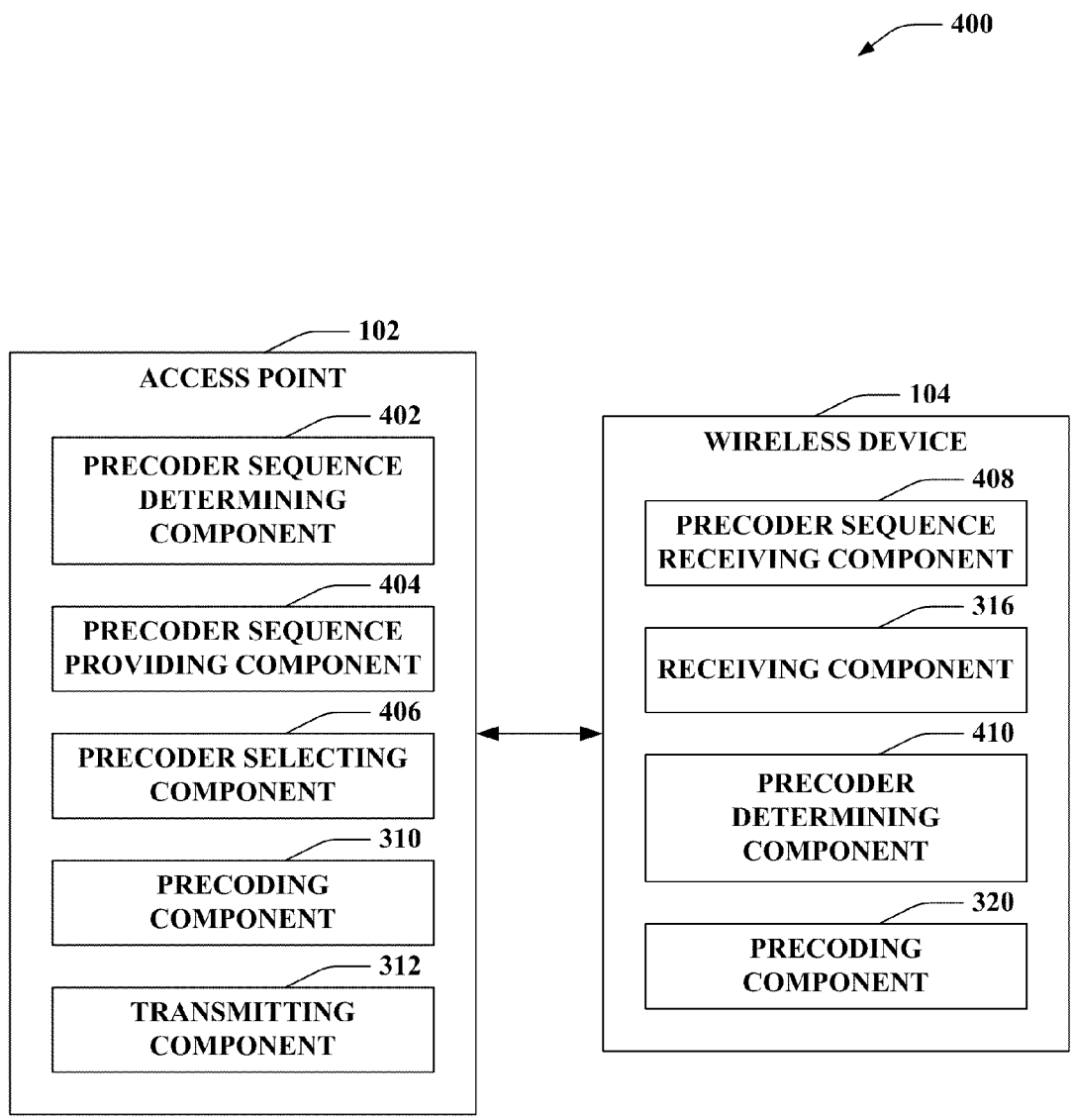
FIG. 4 illustrates an example wireless communication system for precoding signals transmitted over downlink control channel resources based on a sequence of precoders.

Turning to FIG. 4, illustrated is a wireless communications system 400 that facilitates cycling through precoders for transmitting downlink control data. System 400 includes an access point 102 that communicates with one or more wireless devices, such as wireless device 104. Moreover, access point 102 can be a macrocell access point, femtocell access point, picocell access point, mobile base station, and/or the like, and wireless device 104 can be a UE, mobile device, access terminal, subscriber unit, modem (or other tethered device), etc., as described. Furthermore, though the functionalities are shown and described in terms of downlink control channels, it is to be appreciated that access point 102 can comprise components of wireless device 104, and/or vice versa, to provide similar functionality for uplink control channels or other communication channels.

Access point 102 comprises a precoder sequence determining component 402 that receives or generates a sequence of precoders to utilize for precoding downlink control data related to a wireless device and a precoder sequence providing component 404 that communicates the sequence of precoders or related information to the wireless device. Access point 102 additionally includes a precoder selecting component 406 that determines one of the set of precoders for precoding a given signal comprising control data, a precoding component 310 that applies a precoding to the signal based on a determined precoder, and a transmitting component 312 that transmits the one or more precoded signals to a wireless device.

Wireless device 104 includes a precoder sequence receiving component 408 that obtains a set of precoders or related information from an access point and a receiving component 316 that obtains one or more precoded signals from the access point 102. Wireless device 104 further comprises a precoder determining component 410 that selects a precoder from a sequence of precoders related to the one or more precoded signals and a precoding component 320 that utilizes the precoder to decode the one or more precoded signals.

According to an example, precoder sequence determining component 402 can generate or otherwise obtain a set of precoders for precoding control data related to a wireless device. In one example, the set of precoders can be a subset or substantially all of a plurality of available precoders. In one example, the set of precoders can be determined from a configuration, hardcoding, specification, and/or the like, based at least in part on an identifier or other metric of wireless device 104, received from wireless device 104, and/or the like. In another example, precoder sequence determining component 402 can generate the subset of precoders based at least in part on discerning which precoders in a set of available precoders result in desirable feedback from the wireless device 104. For example, this can be determined based at least in part on a received location of the wireless device, previously reported feedback, and/or the like. In yet another example, precoder sequence determining component 402 can generate the set of precoders as a random sequence of precoders or a pseudo-random sequence of precoders selected from a plurality of available precoders. In any case, precoder sequence providing component 404 can signal the set of precoders or related information to wireless device 104.

In one example, precoder sequence providing component 404 can transmit the precoders in sequence to wireless device 104, information regarding the sequence, such as a sequence of indices related to the set of precoders where access point 102 and wireless device 104 can access a common list of available precoders, and/or the like. Precoder sequence receiving component 408 can obtain and store the information for subsequent use in determining precoders related to downlink control data signals. Thus, for example, for an initial control data signal, precoder selecting component 406 can select an initial precoder in the sequence for precoding the control data signal, and precoding component 310 can precode the transmission using the selected precoder. Transmitting component 312 can communicate the precoded control data signal in a wireless network. As described, precoder selecting component 406 can select a next precoder for the next control data signal and so on, cycling through the set of precoders.

It is to be appreciated, in an example, that precoder selecting component 406 can restart the cycle upon reaching the end, apply a shift to the cycle and restart, reverse the cycle, and/or the like to provide further diversity. Moreover, precoder selecting component 406 can alternatively select different precoders in the cycle for each CCE of a signal transmitted over the control channel resources. Furthermore, it is to be appreciated that the cycle can restart for each control data signal, in one example. In any case, it is to be appreciated that parameters regarding cycling through the precoders can additionally be provided to wireless device 104 by precoder sequence providing component 404, determined based at least in part on a specification, hardcoding, configuration, and/or the like at access point 102 and wireless device 104, and/or the like.

Receiving component 316 can obtain the control data signals from access point 102, as described, and precoder determining component 410 can select a precoder related to the control data signal based at least in part on the received sequence and/or parameters regarding cycling. Thus, precoder determining component 410 can select an initial precoder utilized to precode an initial control data signal received over control channel resources, and can select each next precoder in the sequence for subsequent control data signals, as described with respect to precoder selecting component 406. In addition, as similarly described for precoder selecting component 406, precoder determining component 410 can cycle through precoders for each CCE of a control data signal received over the control channel resources, restart the cycle for each control data signal, etc., such that precoder selecting component 406 and precoder determining component 410 are cycling through the same precoders for each given signal or CCE.

Precoding component 320 can apply the precoder to decode the control data signal. In this regard, access point 102 need not acquire feedback from wireless device 104 to select precoders for precoding control data signals nor does it need to transmit DRSs to notify of a precoding utilized. Moreover, in one example, precoder sequence providing component 404 can dynamically or semi-statically (e.g., according to a timer or event) signal to wireless device 104 to enable or disable precoding according to the set of precoder sequences. Precoder sequence receiving component 408, in this example, can obtain the signal and can accordingly enable or disable the functionality at wireless device 104, in one example. Where precoder sequence receiving component 408 disables the functionality, wireless device 104 can apply transmit diversity schemes and/or the like to decode control data signals instead of using precoders, for example.

Referring now to FIGS. 5-8, methodologies that can be performed in accordance with various aspects set forth herein are illustrated. While, for purposes of simplicity of explanation, the methodologies are shown and described as a series of acts, it is to be understood and appreciated that the methodologies are not limited by the order of acts, as some acts can, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 5:
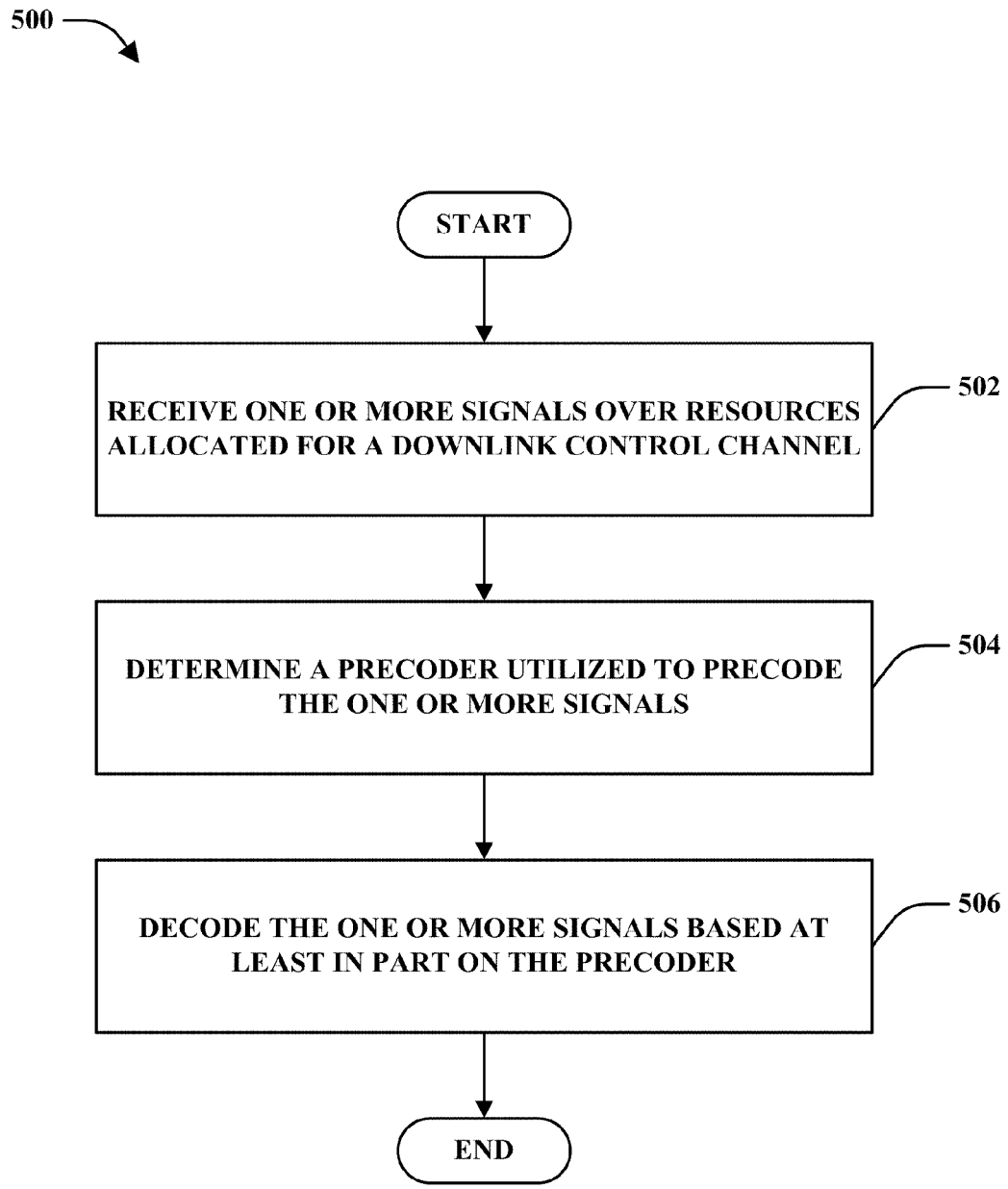
FIG. 5 is a flow diagram of an example methodology that decodes precoded signals received over downlink control channel resources.

With reference to FIG. 5, illustrated is an example methodology 500 for decoding one or more precoded signals received over downlink control channel resources. At 502, one or more signals can be received over resources allocated for a downlink control channel (e.g., PDCCH). As described, the one or signals can be precoded and can be received from one or more access points. At 504, a precoder utilized to precode the one or more signals can be determined. In one example, one or more parameters regarding the precoder can be extracted based at least in part on performing a channel estimation (e.g., MMSE) of a received precoded DRS, selecting the precoder from a sequence of precoders, and/or the like, as described. At 506, the one or more signals can be decoded based at least in part on the precoder. Thus, transmit diversity is provided by allowing precoding of signals transmitting over downlink control channels.

Figure 6:
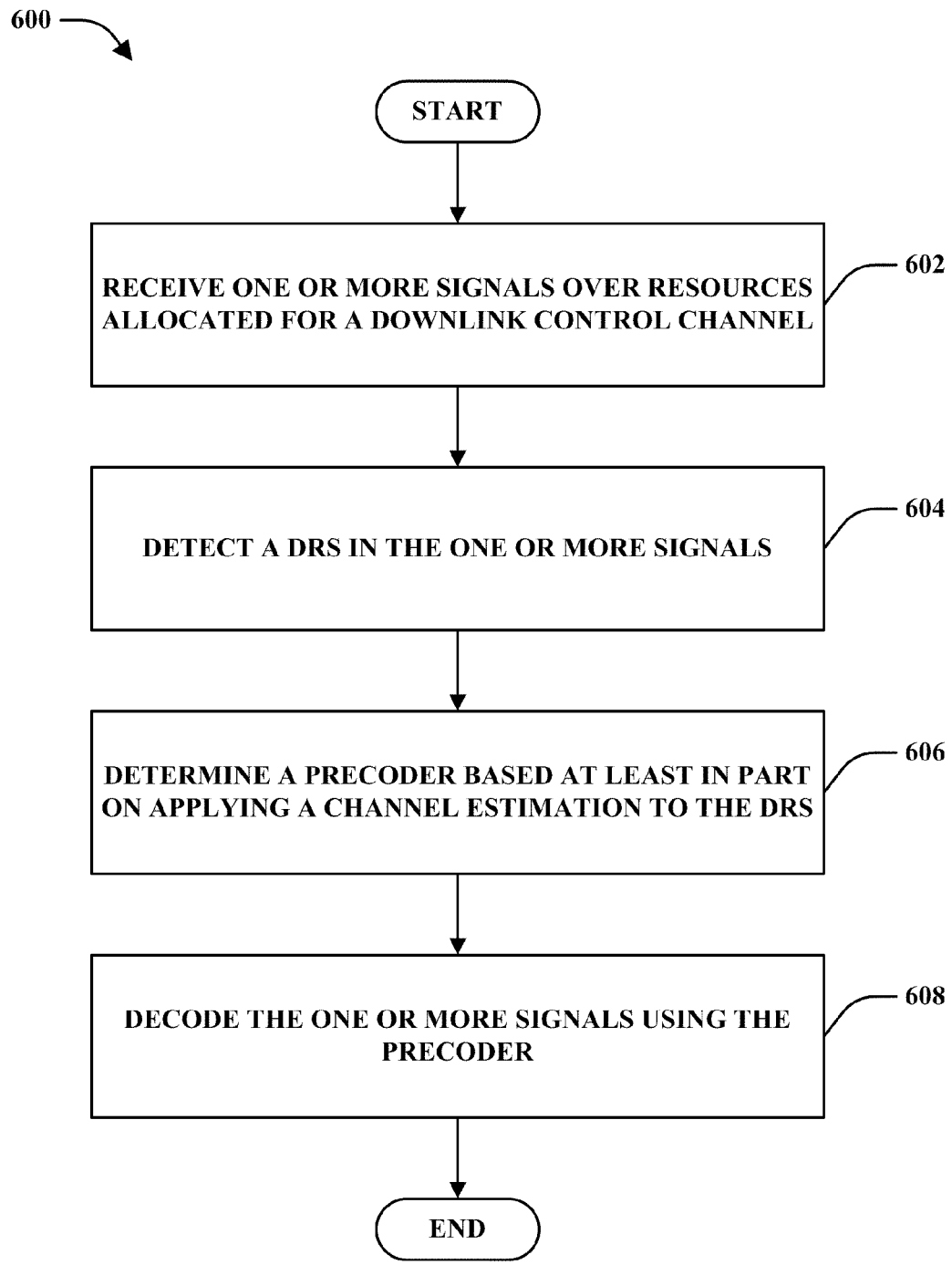
FIG. 6 is a flow diagram of an example methodology that decodes precoded signals received over downlink control channel resources based at least in part on a similarly precoded dedicated reference signal.

Turning now to FIG. 6, an example methodology 600 is shown that facilitates detecting precoding of one or more signals based on a punctured DRS. At 602, one or more signals can be received over resources allocated for a downlink control channel (e.g., PDCCH). In this regard, for example, the one or more signals can include downlink control data. At 604, a DRS can be detected in the one or more signals. As described, the DRS can be punctured in one or more CCEs related to the signals. At 606, a precoder can be determined based at least in part on applying a channel estimation to the DRS. In this regard, the precoder can be cancelled out of the one or more signals, and at 608, the one or more signals are decoded using the precoder.

Figure 7:
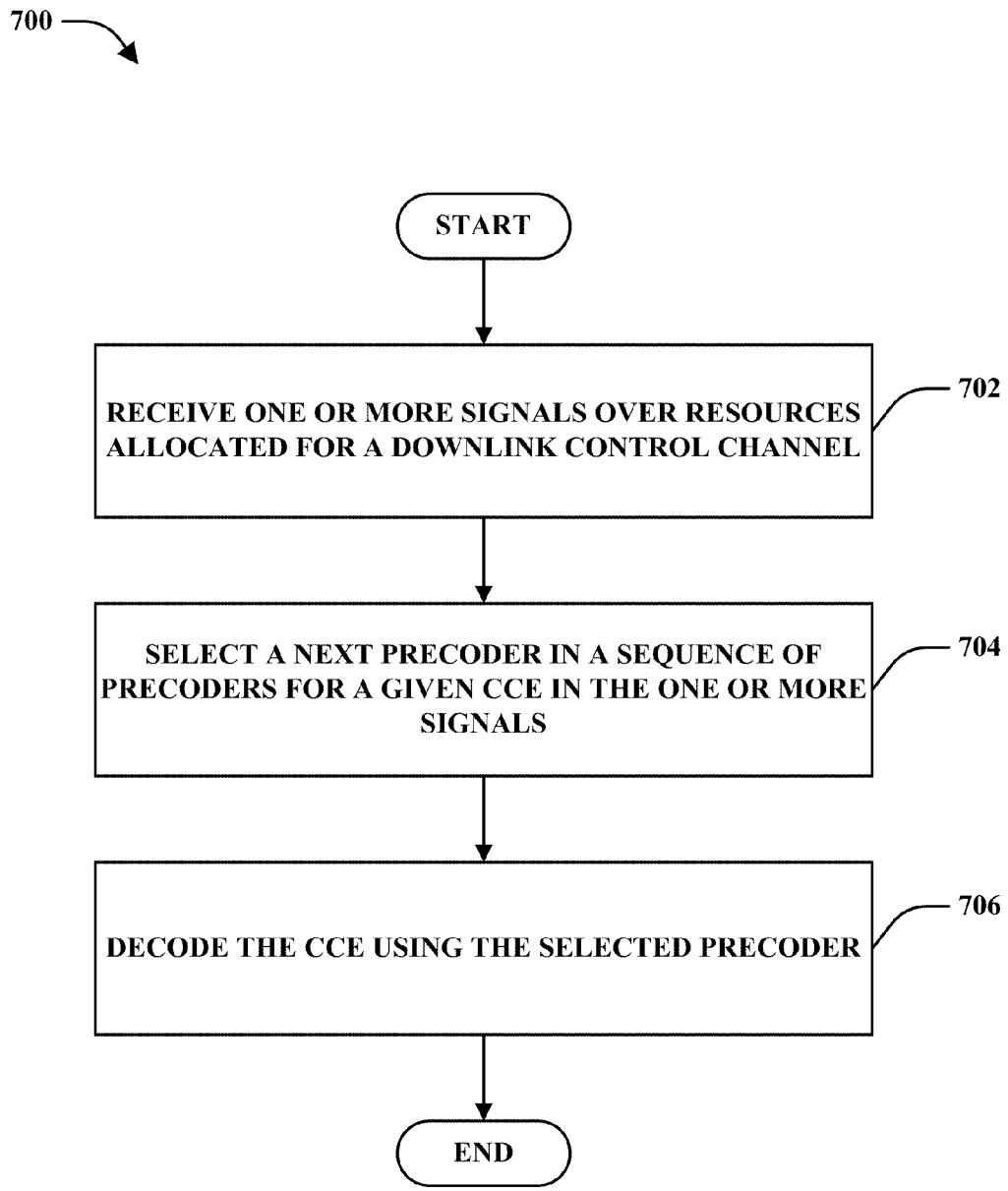
FIG. 7 is a flow diagram of an example methodology that decodes precoded signals received over downlink control channel resources based at least in part on a sequence of precoders.

Referring to FIG. 7, an example methodology 700 that facilitates cycling through precoders to decode received control data signals is illustrated. At 702, one or more signals can be received over resources allocated for a downlink control channel (e.g., PDCCH in LTE). At 704, a next precoder in a sequence of precoders can be selected for a given CCE in the one or more signals. Thus, for example, for each CCE in the one or more signals, a sequence of precoders can be cycled through, and at 706, the CCE can be decoded using the selected precoder. In this regard, as described, an access point, from which the one or more signals can be received, can similarly precode the one or more signals and/or CCEs thereof using a similar sequence of precoders.

Figure 8:
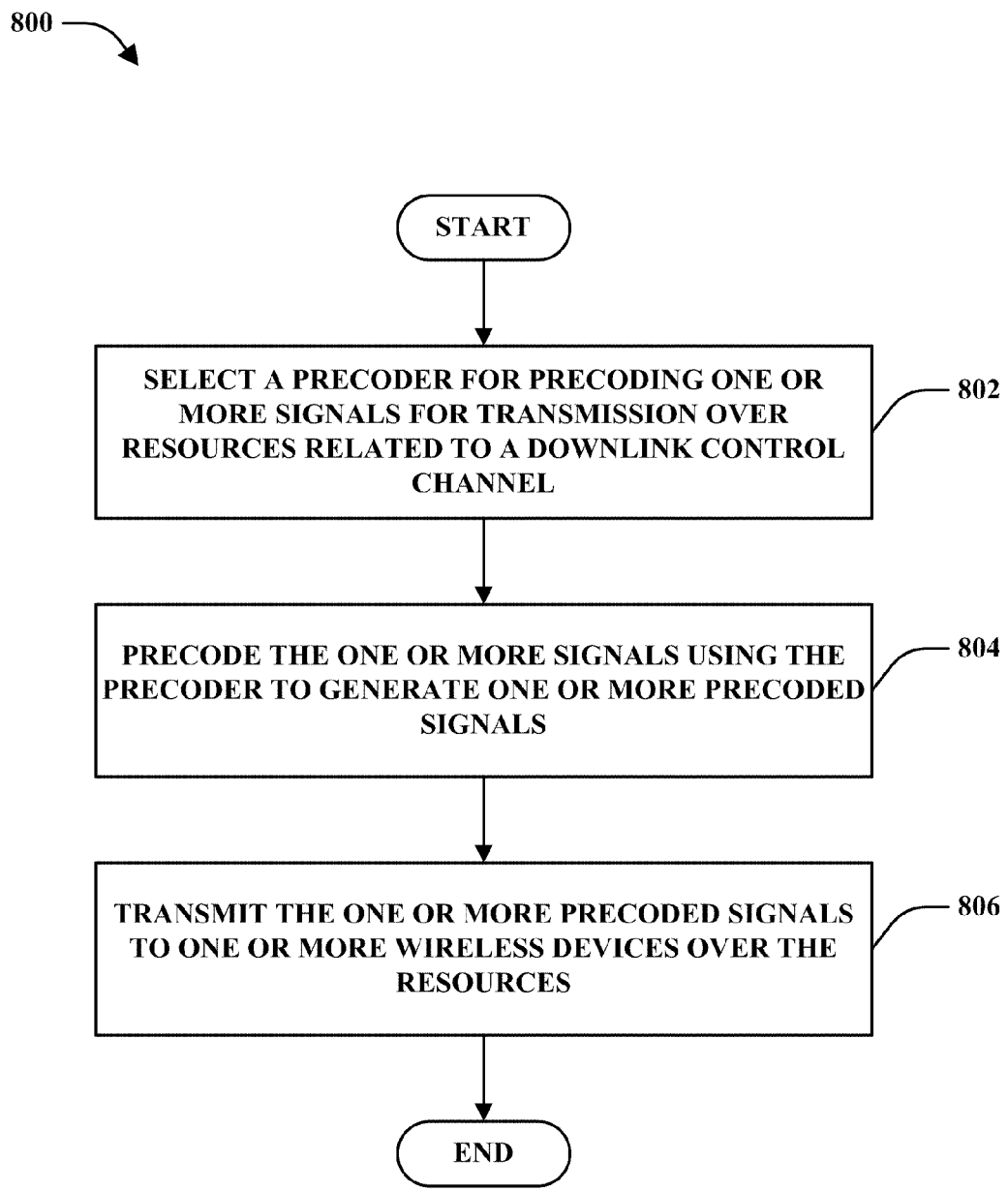
FIG. 8 is a flow diagram of an example methodology that precodes signals transmitted over downlink control channel resources.

Turning to FIG. 8, an example methodology 800 is depicted that precodes one or more signals for transmission over downlink control channel resources. At 802, a precoder can be selected for precoding one or more signals for transmission over resources related to a downlink control channel. As described, the precoder can be selected based at least in part on a CQI, PMI, or similar feedback received from a wireless device, a next precoder in a sequence of precoders (which can be cycled for each CCE in the one or more signals), etc. At 804, the one or more signals can be precoded using the precoder to generate one or more precoded signals. In addition, for example, the one or more signals as precoded can include a DRS related to a wireless device, as described. At 806, the one or more precoded signals can be transmitted to one or more wireless devices over the resources. Thus, precoding is provided for control data signals transmitted over control channel resources, as described.

It will be appreciated that, in accordance with one or more aspects described herein, inferences can be made regarding determining a precoder to utilize for precoding and/or decoding a transmitted/received signal, generating a sequence of precoders for applying to one or more signals, and/or the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 9:
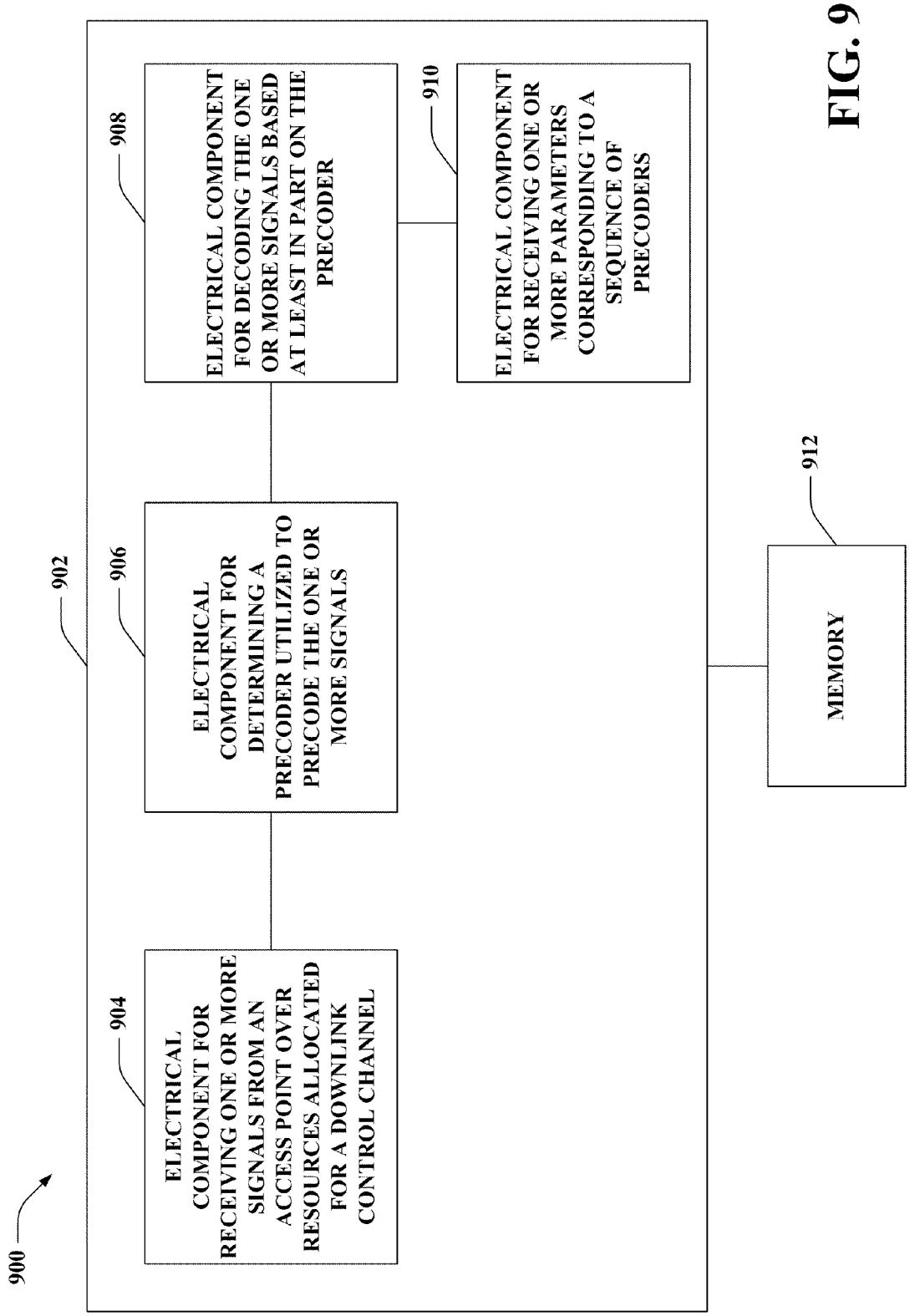
FIG. 9 is a block diagram of an example apparatus that decodes precoded signals received over downlink control channel resources.

With reference to FIG. 9, illustrated is a system 900 that facilitates determining a precoder utilized to precode one or more signals received over control channel resources. For example, system 900 can reside at least partially within a base station, wireless device, or another device that provides access to a wireless network. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component 904 for receiving one or more signals from an access point over resources allocated for a downlink control channel. As described, the one or more signals can include control data and can be precoded by the access point to provide diversity for mitigating co-channel interference. Further, logical grouping 902 can comprise an electrical component 906 for determining a precoder utilized to precode the one or more signals.

As described, for example, electrical component 906 can determine the precoder (or one or more related parameters) based at least in part on performing channel estimation for a received DRS that is precoded with the same precoder, selecting a next precoder in a sequence of precoders that is cycled for each precoding (e.g., each CCE), and/or the like. Furthermore, logical grouping 902 can include an electrical component 908 for decoding the one or more signals based at least in part on the precoder. Logical grouping 902 can also comprise an electrical component 910 for receiving one or more parameters corresponding to a sequence of precoders. Thus, as described, a sequence of precoders can be received from the access point and can be cycled through to precode/decode signals at access point and logical grouping 902. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
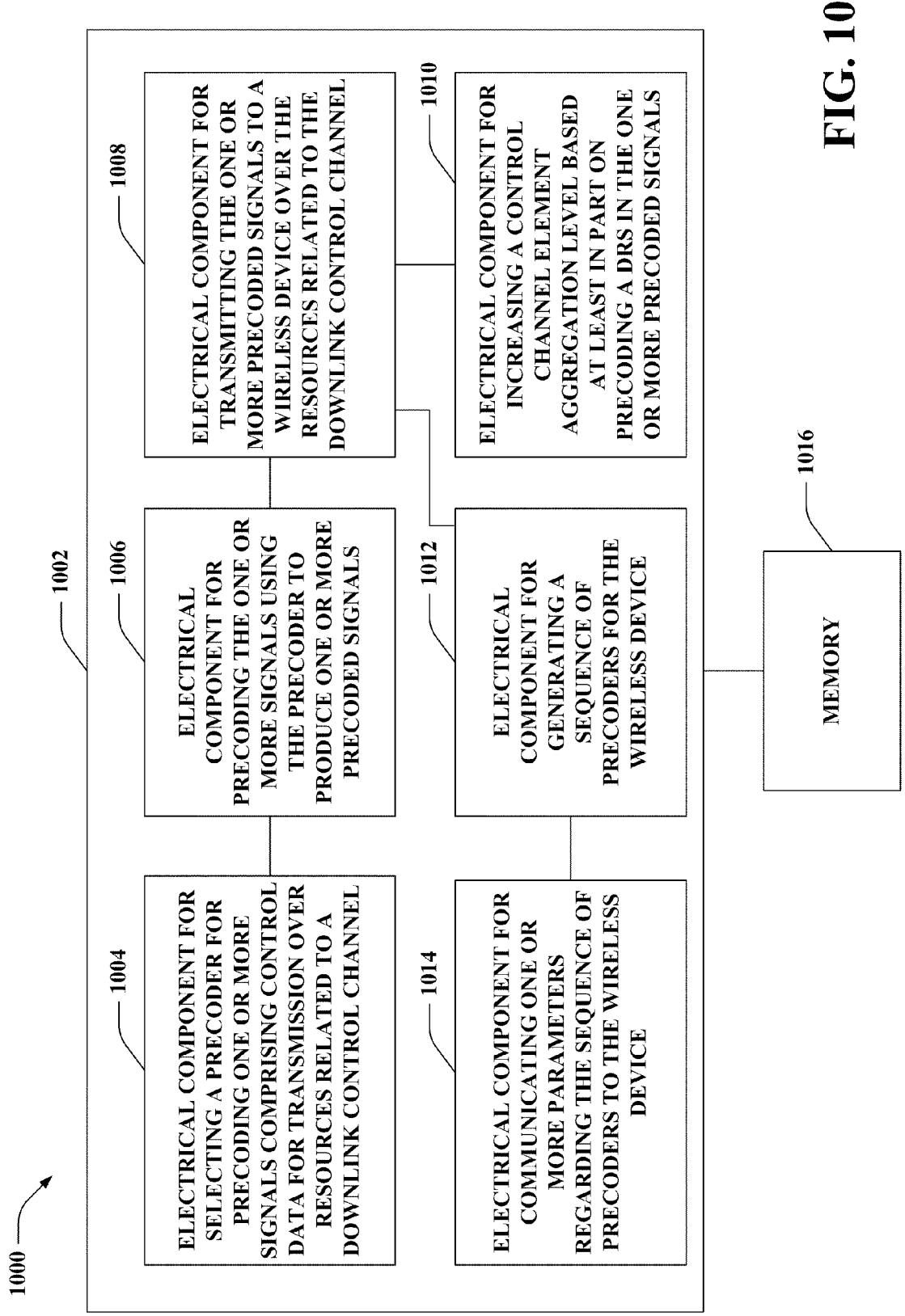
FIG. 10 is a block diagram of an example apparatus that precodes signals transmitted over downlink control channel resources.

Now referring to FIG. 10, illustrated is a system 1000 that facilitates precoding signals for transmitting over downlink control channel resources. For example, system 1000 can reside at least partially within a base station, wireless device, or another device that provides access to a wireless network. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component 1004 for selecting a precoder for precoding one or more signals comprising control data for transmission over resources related to a downlink control channel. As described, the precoder can be selected based at least in part on CQI, PMI, or similar feedback received from a wireless device, a sequence of precoders generated for the wireless device, and/or the like. Further, logical grouping 1002 can comprise an electrical component 1006 for precoding the one or more signals using the precoder to produce one or more precoded signals.

Furthermore, logical grouping 1002 can include an electrical component 1008 for transmitting the one or more precoded signals to a wireless device over resources related to the downlink control channel. In addition, as described, electrical component 1006 can additionally precode, and electrical component 1008 can additionally transmit, a DRS specific to the wireless device in the resources related to the downlink control channel to facilitate determining the precoder. In this regard, logical grouping 1002 can include an electrical component 1010 for increasing a control channel element aggregation level based at least in part on precoding a DRS in the one or more precoded signals. As described, including the DRS in the control signals can degrade a quality thereof; thus, additional CCEs can be utilized to provide increase communication quality.

In addition, logical grouping 1002 can include an electrical component 1012 for generating a sequence of precoders for the wireless device. As described, the sequence of precoders can be cycled through by the wireless device and logical grouping 1002 to provide diversity for transmitting signals over downlink control channel resources. Further, logical grouping 1002 can include an electrical component 1014 for communicating one or more parameters regarding the sequence of precoders to the wireless device. Thus, the wireless device, as described, can utilize the same sequence to determine a precoder utilized to precode signals transmitted over the downlink control channel resources. Additionally, system 1000 can include a memory 1016 that retains instructions for executing functions associated with electrical components 1004, 1006, 1008, 1010, 1012, and 1014. While shown as being external to memory 1016, it is to be understood that one or more of electrical components 1004, 1006, 1008, 1010, 1012, and 1014 can exist within memory 1016.

Figure 11:
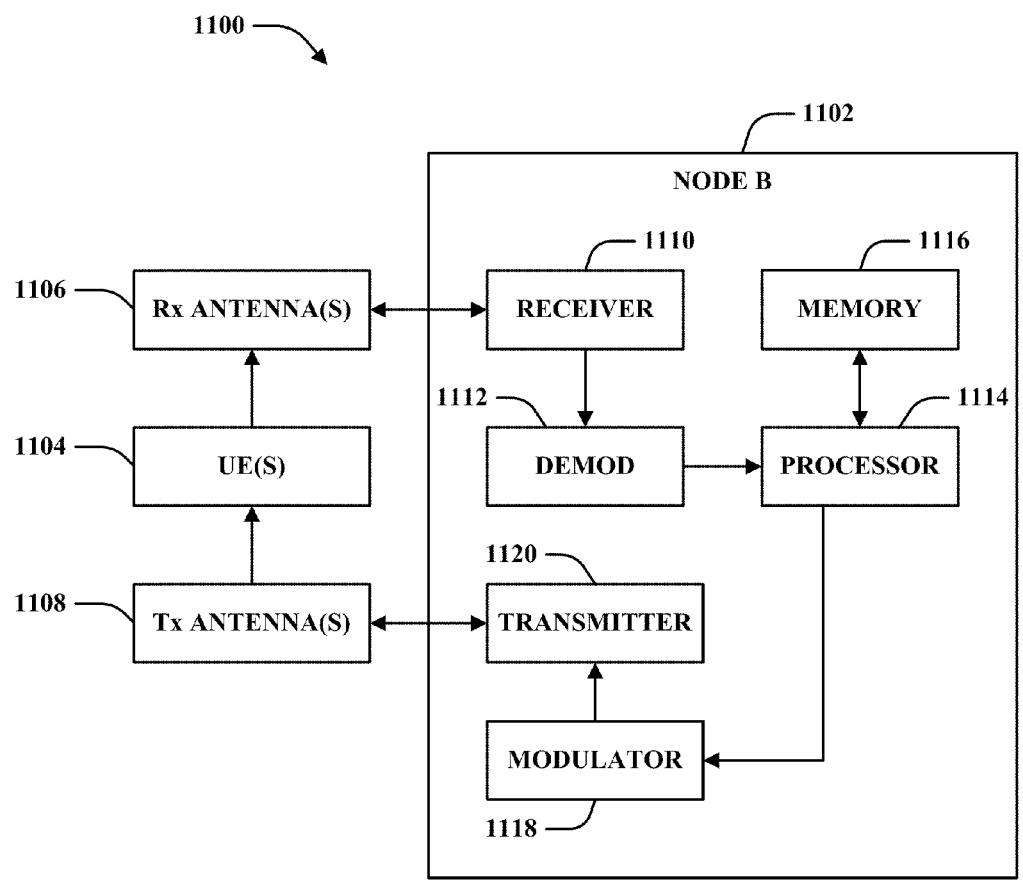
FIGS. 11-12 are block diagrams of example wireless communication devices that can be utilized to implement various aspects of the functionality described herein.

FIG. 11 is a block diagram of a system 1100 that can be utilized to implement various aspects of the functionality described herein. In one example, system 1100 includes a base station or Node B 1102. As illustrated, Node B 1102 can receive signal(s) from one or more UEs 1104 via one or more receive (Rx) antennas 1106 and transmit to the one or more UEs 1104 via one or more transmit (Tx) antennas 1108. Additionally, Node B 1102 can comprise a receiver 1110 that receives information from receive antenna(s) 1106. In one example, the receiver 1110 can be operatively associated with a demodulator (Demod) 1112 that demodulates received information. Demodulated symbols can then be analyzed by a processor 1114. Processor 1114 can be coupled to memory 1116, which can store information related to code clusters, access terminal assignments, lookup tables related thereto, unique scrambling sequences, and/or other suitable types of information. In one example, Node B 1102 can employ processor 1114 to perform methodologies 500, 600, 700, 800, and/or other similar and appropriate methodologies. Node B 1102 can also include a modulator 1118 that can multiplex a signal for transmission by a transmitter 1120 through transmit antenna(s) 1108.

Figure 12:
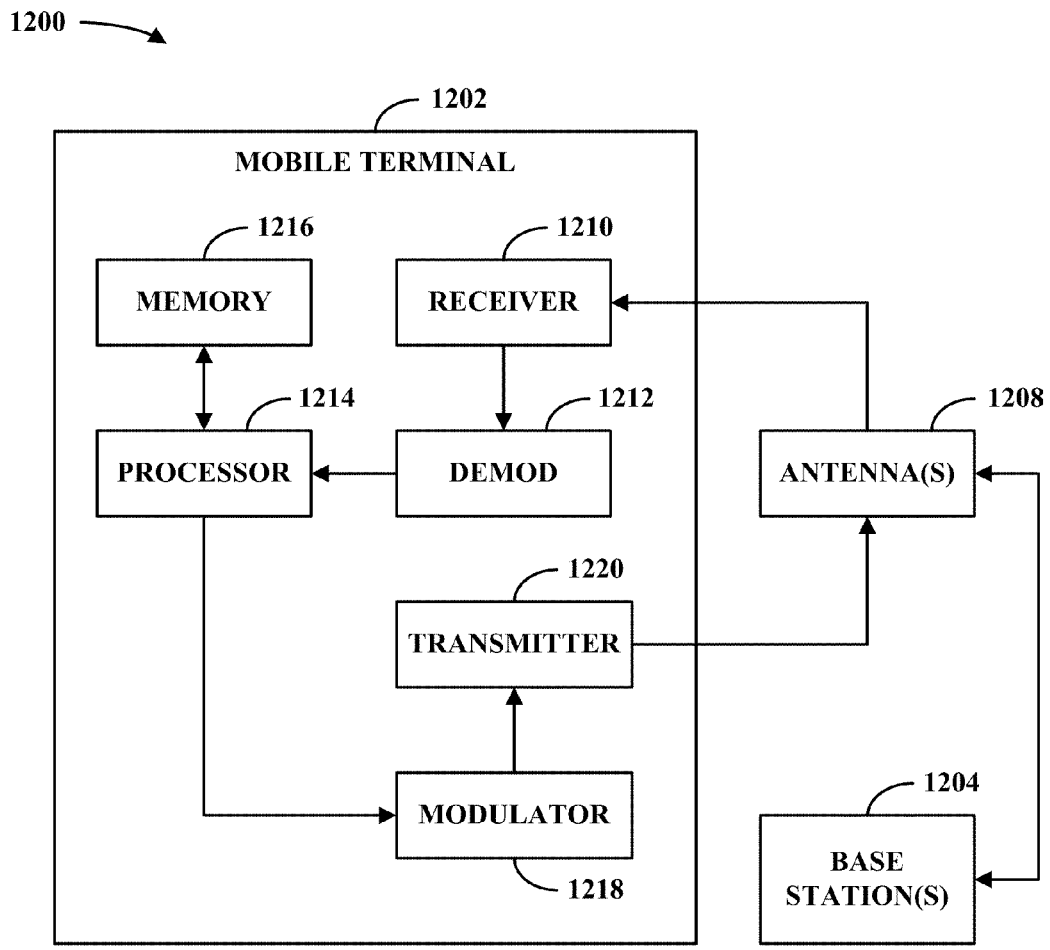

FIG. 12 is a block diagram of another system 1200 that can be utilized to implement various aspects of the functionality described herein. In one example, system 1200 includes a mobile terminal 1202. As illustrated, mobile terminal 1202 can receive signal(s) from one or more base stations 1204 and transmit to the one or more base stations 1204 via one or more antennas 1208. Additionally, mobile terminal 1202 can comprise a receiver 1210 that receives information from antenna(s) 1208. In one example, receiver 1210 can be operatively associated with a demodulator (Demod) 1212 that demodulates received information. Demodulated symbols can then be analyzed by a processor 1214. Processor 1214 can be coupled to memory 1216, which can store data and/or program codes related to mobile terminal 1202. Additionally, mobile terminal 1202 can employ processor 1214 to perform methodologies 500, 600, 700, 800, and/or other similar and appropriate methodologies. Mobile terminal 1202 can also employ one or more components described in previous figures to effectuate the described functionality; in one example, the components can be implemented by the processor 1214. Mobile terminal 1202 can also include a modulator 1218 that can multiplex a signal for transmission by a transmitter 1220 through antenna(s) 1208.

Figure 13:
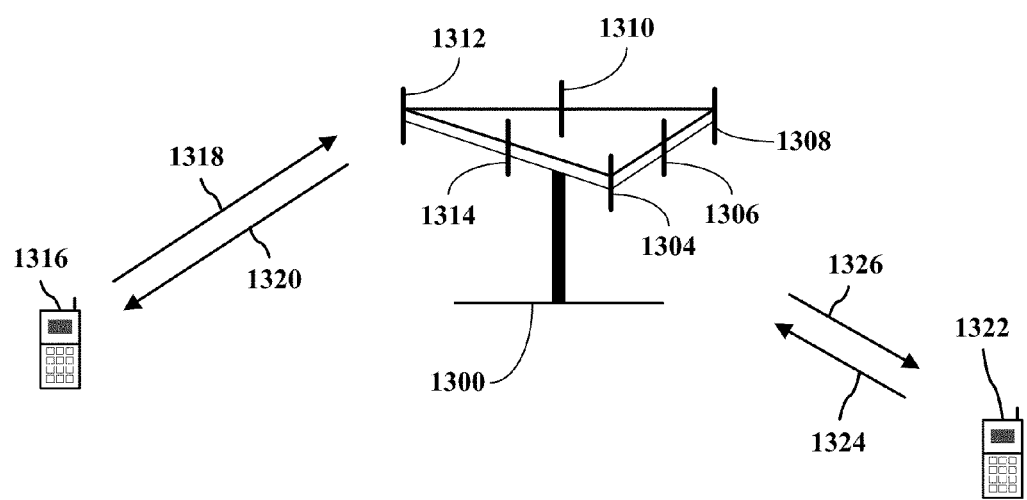
FIG. 13 illustrates an example wireless multiple-access communication system in accordance with various aspects set forth herein.

Referring now to FIG. 13, an illustration of a wireless multiple-access communication system is provided in accordance with various aspects. In one example, an access point 1300 includes multiple antenna groups. As illustrated in FIG. 13, one antenna group can include antennas 1304 and 1306, another can include antennas 1308 and 1310, and another can include antennas 1312 and 1314. While only two antennas are shown in FIG. 13 for each antenna group, it should be appreciated that more or fewer antennas may be utilized for each antenna group. In another example, an access terminal 1316 can be in communication with antennas 1312 and 1314, where antennas 1312 and 1314 transmit information to access terminal 1316 over forward link 1320 and receive information from access terminal 1316 over reverse link 1318. Additionally and/or alternatively, access terminal 1322 can be in communication with antennas 1306 and 1308, where antennas 1306 and 1308 transmit information to access terminal 1322 over forward link 1326 and receive information from access terminal 1322 over reverse link 1324. In a frequency division duplex system, communication links 1318, 1320, 1324 and 1326 can use different frequency for communication. For example, forward link 1320 may use a different frequency then that used by reverse link 1318.

Each group of antennas and/or the area in which they are designed to communicate can be referred to as a sector of the access point. In accordance with one aspect, antenna groups can be designed to communicate to access terminals in a sector of areas covered by access point 1300. In communication over forward links 1320 and 1326, the transmitting antennas of access point 1300 can utilize beamforming or precoding to improve the signal-to-noise ratio of forward links for the different access terminals 1316 and 1322. Also, an access point using beamforming or precoding to transmit to access terminals scattered randomly through its coverage causes less interference to access terminals in neighboring cells than an access point transmitting through a single antenna to all its access terminals.

Access point 1300, can be a fixed station used for communicating with terminals and can also be referred to as a base station, a Node B, an access network, and/or other suitable terminology. In addition, access terminal 1316 or 1322, can also be referred to as a mobile terminal, user equipment (UE), a wireless communication device, a terminal, a wireless terminal, and/or other appropriate terminology.

Figure 14:
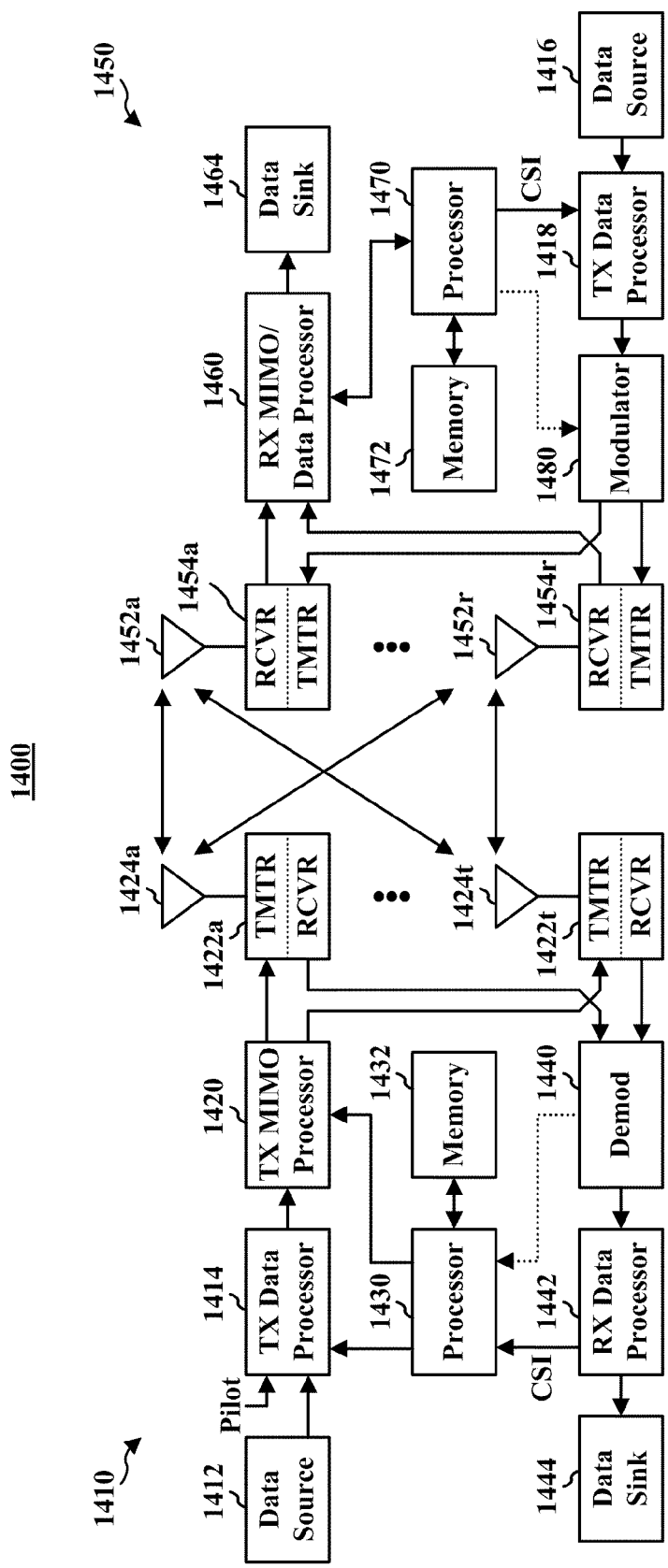
FIG. 14 is a block diagram illustrating an example wireless communication system in which various aspects described herein can function.

Referring now to FIG. 14, a block diagram illustrating an example wireless communication system 1400 in which various aspects described herein can function is provided. In one example, system 1400 is a multiple-input multiple-output (MIMO) system that includes a transmitter system 1410 and a receiver system 1450. It should be appreciated, however, that transmitter system 1410 and/or receiver system 1450 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1410 and/or receiver system 1450 described herein could be utilized in connection with a single output to single input antenna system.

In accordance with one aspect, traffic data for a number of data streams are provided at transmitter system 1410 from a data source 1412 to a transmit (TX) data processor 1414. In one example, each data stream can then be transmitted via a respective transmit antenna 1424. Additionally, TX data processor 1414 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1450 to estimate channel response. Back at transmitter system 1410, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1430.

Next, modulation symbols for all data streams can be provided to a TX MIMO processor 1420, which can further process the modulation symbols (e.g., for OFDM). TX MIMO processor 1420 can then provides $N_T$ modulation symbol streams to $N_T$ transceivers 1422a through 1422t. In one example, each transceiver 1422 can receive and process a respective symbol stream to provide one or more analog signals. Each transceiver 1422 can then further condition (e.g., amplify, filter, and up-convert) the analog signals to provide a modulated signal suitable for transmission over a MIMO channel. Accordingly, $N_T$ modulated signals from transceivers 1422a through 1422t can then be transmitted from $N_T$ antennas 1424a through 1424t, respectively.

In accordance with another aspect, the transmitted modulated signals can be received at receiver system 1450 by $N_R$ antennas 1452a through 1452r. The received signal from each antenna 1452 can then be provided to respective transceivers 1454. In one example, each transceiver 1454 can condition (e.g., filter, amplify, and down-convert) a respective received signal, digitize the conditioned signal to provide samples, and then processes the samples to provide a corresponding "received" symbol stream. An RX MIMO/data processor 1460 can then receive and process the $N_R$ received symbol streams from $N_R$ transceivers 1454a through 1454r based on a particular receiver processing technique to provide $N_T$ "detected" symbol streams. In one example, each detected symbol stream can include symbols that are estimates of the modulation symbols transmitted for the corresponding data stream. RX MIMO/data processor 1460 can then process each symbol stream at least in part by demodulating, deinterleaving, and decoding each detected symbol stream to recover traffic data for a corresponding data stream. Thus, the processing by RX MIMO/data processor 1460 can be complementary to that performed by TX MIMO processor 1420 and TX data processor 1418 at transmitter system 1410. RX MIMO/data processor 1460 can additionally provide processed symbol streams to a data sink 1464.

In accordance with one aspect, the channel response estimate generated by RX MIMO/data processor 1460 can be used to perform space/time processing at the receiver, adjust power levels, change modulation rates or schemes, and/or other appropriate actions. Additionally, RX MIMO/data processor 1460 can further estimate channel characteristics such as, for example, signal-to-noise-and-interference ratios (SNRs) of the detected symbol streams. RX MIMO/data processor 1460 can then provide estimated channel characteristics to a processor 1470. In one example, RX MIMO/data processor 1460 and/or processor 1470 can further derive an estimate of the "operating" SNR for the system. Processor 1470 can then provide channel state information (CSI), which can comprise information regarding the communication link and/or the received data stream. This information can include, for example, the operating SNR. The CSI can then be processed by a TX data processor 1418, modulated by a modulator 1480, conditioned by transceivers 1454a through 1454r, and transmitted back to transmitter system 1410. In addition, a data source 1416 at receiver system 1450 can provide additional data to be processed by TX data processor 1418.

Back at transmitter system 1410, the modulated signals from receiver system 1450 can then be received by antennas 1424, conditioned by transceivers 1422, demodulated by a demodulator 1440, and processed by a RX data processor 1442 to recover the CSI reported by receiver system 1450. In one example, the reported CSI can then be provided to processor 1430 and used to determine data rates as well as coding and modulation schemes to be used for one or more data streams. The determined coding and modulation schemes can then be provided to transceivers 1422 for quantization and/or use in later transmissions to receiver system 1450. Additionally and/or alternatively, the reported CSI can be used by processor 1430 to generate various controls for TX data processor 1414 and TX MIMO processor 1420. In another example, CSI and/or other information processed by RX data processor 1442 can be provided to a data sink 1444.

In one example, processor 1430 at transmitter system 1410 and processor 1470 at receiver system 1450 direct operation at their respective systems. Additionally, memory 1432 at transmitter system 1410 and memory 1472 at receiver system 1450 can provide storage for program codes and data used by processors 1430 and 1470, respectively. Further, at receiver system 1450, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

It is to be understood that the aspects described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method for wireless communication, comprising:
    receiving, at a wireless device, one or more signals from a wireless access point over resources allocated for a downlink control channel;
    receiving, from the wireless access point, information about a sequence of precoders, the information including a set of precoders and a cycling pattern for the set;
    determining, at the wireless device, a precoder selected by the wireless access point to precode the one or more signals, the determining being based on a channel estimation at the wireless device of at least a reference signal of the one or more signals and on the cycling pattern for the set of precoders; and
    decoding, at the wireless device, the one or more signals based at least in part on the precoder.

2. The method of claim 1, wherein the reference signal comprises a received dedicated reference signal (DRS).

3. The method of claim 2, wherein the receiving the one or more signals comprises receiving one or more control channel elements comprising control data and the received DRS.

4. The method of claim 2, wherein the performing the channel estimation is further based at least in part on a received common reference signal.

5. The method of claim 1, wherein the determining the precoder includes selecting a next precoder in the sequence of precoders for at least a portion of the one or more signals.

6. The method of claim 1, further comprising receiving one or more parameters regarding the sequence of precoders from the wireless access point, wherein the receiving the one or more signals includes receiving the one or more signals from the wireless access point.

7. The method of claim 5, wherein the selecting the next precoder in the sequence of precoders comprises selecting the next precoder for each control channel element in the one or more signals.

8. The method of claim 1, further comprising transmitting control data regarding a common reference signal to an access point, wherein the receiving the one or more signals includes receiving the one or more signals from the access point.

9. An apparatus for wireless communication, comprising:
at least one processor configured to:
receive, at a wireless device, one or more signals from a wireless access point over resources allocated for a downlink control channel;
receive, from the wireless access point, information about a sequence of precoders, the information including a set of precoders and a cycling pattern for the set;
determine, at the wireless device, a precoder selected by the wireless access point to precode the one or more signals, the determination being based on a channel estimation at the wireless device of a reference signal of the one or more signals and on the cycling pattern for the set of precoders; and
decode, at the wireless device, the one or more signals based at least in part on the precoder; and
a memory coupled to the at least one processor.

10. The apparatus of claim 9, wherein:
the reference signal comprises a received dedicated reference signal (DRS).

11. The apparatus of claim 10, wherein the at least one processor is configured to receive control data and the DRS as part of the one or more signals.

12. The apparatus of claim 9, wherein:
the at least one processor is further configured to receive one or more parameters regarding the sequence of precoders from the wireless access point; and
the at least one processor is further configured to determine the precoder based at least in part on a selection of a next precoder in the sequence of precoders.

13. The apparatus of claim 12, wherein the selection of the next precoder in the sequence of precoders is for each control channel element in the one or more signals.

14. An apparatus for wireless communication, comprising:
means for receiving, at a wireless device, one or more signals from a wireless access point over resources allocated for a downlink control channel;
means for receiving, from the wireless access point, information about a sequence of precoders, the information including a set of precoders and a cycling pattern for the set;
means for determining, at the wireless device, a precoder selected by the wireless access point to precode the one or more signals, the means for determining the precoder being based on a channel estimation at the wireless device of a reference signal of the one or more signals and on the cycling pattern for the set of precoders; and
means for decoding, at the wireless device, the one or more signals based at least in part on the precoder.

15. The apparatus of claim 14, wherein the reference signal comprises a received dedicated reference signal (DRS).

16. The apparatus of claim 15, wherein the one or more signals includes control data and the DRS.

17. The apparatus of claim 14, further comprising means for receiving one or more parameters regarding the sequence of precoders from the wireless access point, wherein the means for determining the precoder comprises means for selecting a next precoder in the sequence of precoders based at least in part on the one or more parameters.

18. A computer program product, comprising:
a non-transitory computer-readable medium comprising:
code for causing at least one computer to receive, at a wireless device, one or more signals from a wireless access point over resources allocated for a downlink control channel;
code for causing the at least one computer to receive, from the wireless access point, information about a sequence of precoders, the information including a set of precoders and a cycling pattern for the set;
code for causing the at least one computer to determine, at the wireless device, a precoder selected by the wireless access point to precode the one or more signals, the determination being based on a channel estimation at the wireless device of a reference signal of the one or more signals and on the cycling pattern for the set of precoders ; and
code for causing the at least one computer to decode the one or more signals based at least in part on the precoder.

19. The computer program product of claim 18, wherein the portion of the one or more signals comprises a received dedicated reference signal (DRS).

20. The computer program product of claim 19, wherein the computer-readable medium further comprises code for causing the at least one computer to receive control data and the DRS as part of the one or more signals.

21. The computer program product of claim 18, wherein the computer-readable medium further comprises code for causing the at least one computer to receive one or more parameters regarding the sequence of precoders from the wireless access point, and wherein the code for causing the at least one computer to determine the precoder is based at least in part on a selection of a next precoder in the sequence of precoders.

22. The computer program product of claim 21, wherein the selection of the next precoder is for each control channel element in the one or more signals.

23. A method for wireless communication, comprising:
selecting, at a wireless access point, a precoder for precoding at least a reference signal and one or more control signals for transmission to a wireless device over resources related to a downlink control channel, the selecting being based on information about a sequence of precoders, the information including a set of precoders and a cycling pattern for the set;
precoding, at the wireless access point, the reference signal and the one or more control signals using the precoder to generate a precoded reference signal and one or more precoded control signals;
identifying the selected precoder to the wireless device by transmitting the precoded reference signal from the wireless access point to the wireless device; and
transmitting the one or more precoded control signals from the wireless access point to the wireless device over the resources related to the downlink control channel.

24. The method of claim 23, wherein the selecting the precoder is based at least in part on a channel quality indicator or a precoding matrix indicator received from the wireless device.

25. The method of claim 24, wherein the reference signal comprises a dedicated reference signal (DRS) specific to the wireless device.

26. The method of claim 25, further comprising increasing an aggregation level of control channel elements related to the one or more control signals based at least in part on precoding the DRS.

27. The method of claim 23, wherein the selecting the precoder comprises selecting a next precoder in the sequence of precoders for at least a portion of the one or more control signals.

28. The method of claim 23, further comprising:
generating the sequence of precoders for the wireless device; and
transmitting one or more parameters regarding the sequence of precoders to the wireless device.

29. The method of claim 28, wherein the generating the sequence of precoders comprises generating a random sequence of precoders or generating the sequence of precoders based at least in part on feedback received from the wireless device.

30. A wireless access point apparatus for wireless communication, comprising:
at least one processor configured to:
select, at the wireless access point apparatus, a precoder for precoding at least a reference signal and one or more control signals for transmission to a wireless device over downlink control channel resources, the selection being based on information about a sequence of precoders, the information including a set of precoders and a cycling pattern for the set;
precode, at the wireless access point apparatus, the reference signal and the one or more control signals using the precoder to generate a precoded reference signal and one or more precoded control signals;
identify the selected precoder to the wireless device by transmitting the precoded reference signal from the wireless access point to the wireless device; and
transmit the one or more precoded control signals from the wireless access point apparatus to the wireless device over the downlink control channel resources; and
a memory coupled to the at least one processor.

31. The wireless access point apparatus of claim 30, wherein the at least one processor is configured to select the precoder based at least in part on a channel quality indicator or precoding matrix indicator received from the wireless device.

32. The wireless access point apparatus of claim 31, wherein the reference signal comprises a dedicated reference signal (DRS) specific to the wireless device.

33. The wireless access point apparatus of claim 32, wherein the at least one processor is further configured to increase a control channel element aggregation level related to the one or more control signals based at least in part on precoding the DRS.

34. The wireless access point apparatus of claim 30, wherein the at least one processor is configured to select a next precoder in the sequence of precoders for at least a portion of the one or more control signals.

35. The wireless access point apparatus of claim 30, wherein:
the at least one processor is further configured to generate the sequence of precoders for the wireless device; and
the at least one processor is further configured to transmit one or more parameters regarding the sequence of precoders to the wireless device.

36. The wireless access point apparatus of claim 34, wherein the at least one processor is configured to select the next precoder for each control channel element in the one or more control signals.

37. A wireless access point apparatus for wireless communication, comprising:
means for selecting, at a wireless access point apparatus, a precoder for precoding at least a reference signal and one or more control signals for transmission to a wireless device over resources related to a downlink control channel, the selecting being based on information about a sequence of precoders, the information including a set of precoders and a cycling pattern for the set;
means for precoding, at the wireless access point apparatus, the reference signal and the one or more control signals using the precoder to generate a precoded reference signal and one or more precoded control signals;
means for identifying the selected precoder to the wireless device by transmitting the precoded reference signal from the wireless access point to the wireless device; and
means for transmitting the one or more precoded control signals from the wireless access point apparatus to the wireless device over the resources related to the downlink control channel.

38. The wireless access point apparatus of claim 37, wherein the means for selecting comprises means for selecting the precoder based at least in part on a channel quality indicator or a precoding matrix indicator received from the wireless device.

39. The wireless access point apparatus of claim 37, wherein the reference signal comprises a dedicated reference signal (DRS) specific to the wireless device.

40. The wireless access point apparatus of claim 37, further comprising:
means for generating the sequence of precoders for the wireless device; and
means for transmitting one or more parameters regarding the sequence of precoders to the wireless device.

41. The wireless access point apparatus of claim 40, wherein the means for generating the sequence of precoders comprises means for generating a random sequence of precoders or generating the sequence of precoders based at least in part on feedback received from the wireless device.

42. The wireless access point apparatus of claim 40, further comprising means for increasing a control channel element aggregation level related to the one or more control signals based at least in part on precoding the DRS.

43. A computer program product, comprising:
a non-transitory computer-readable medium comprising:
code for causing at least one computer to select, at the wireless access point, a precoder for precoding at least a reference signal and one or more control signals for transmission to a wireless device over downlink control channel resources, the selection being based on information about a sequence of precoders, the information including a set of precoders and a cycling pattern for the set;
code for causing the at least one computer to precode, at the wireless access point, the reference signal and the one or more control signals using the precoder to generate a precoded reference signal and one or more precoded control signals;
code for causing the at least one computer to identify the selected precoder to the wireless device by transmitting the precoded reference signal from the wireless access point to the wireless device; and
code for causing the at least one computer to transmit the one or more precoded control signals from the wireless access point to the wireless device over the downlink control channel resources.

44. The computer program product of claim 43, wherein the code for causing the at least one computer to select the precoder comprises code for causing the at least one computer to select the precoder based at least in part on a channel quality indicator or precoding matrix indicator received from the wireless device.

45. The computer program product of claim 43, wherein the reference signal comprises to a dedicated reference signal (DRS) specific to the wireless device.

46. The computer program product of claim 45, wherein the computer-readable medium further comprises code for causing the at least one computer to increase a control channel element aggregation level related to the one or more control signals based at least in part on precoding the DRS.

47. The computer program product of claim 43, wherein the code for causing the at least one computer to select the precoder comprises code for causing the at least one computer to cycle through the sequence of precoders for precoding the one or more signals.

* * * * *